S. W. Smith.
Flat Iron Heater.
Nº 75995      Patented Mar. 24, 1868.
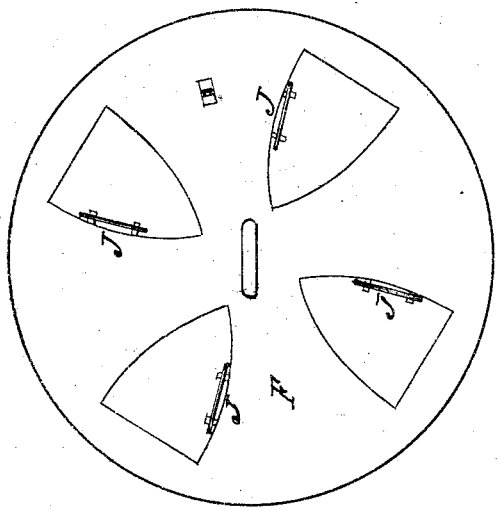
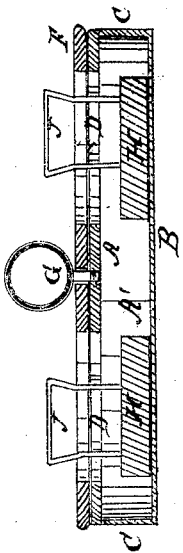
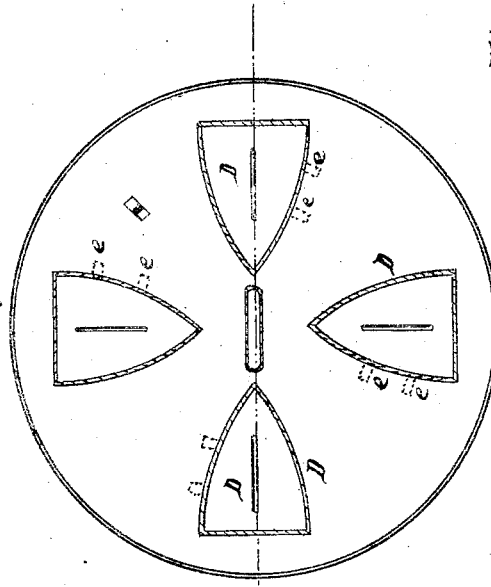
Witnesses.
W. C. Ashkeitler
J. A. Fraser
Inventor.
S. W. Smith
per Munn & Co.
Attorneys

United States Patent Office.

S. W. SMITH, OF ADDISON, VERMONT.

Letters Patent No. 75,995, dated March 24, 1868.

IMPROVEMENT IN FLAT-IRON HEATERS.

*The Schedule referred to in these Letters Patent and making part of the same.*

TO ALL WHOM IT MAY CONCERN:

Be it known that I, S. W. SMITH, of Addison, in the county of Addison, and State of Vermont, have invented a new and improved Flat-Iron Heater; and I do hereby declare that the following is a full, clear, and exact description thereof, which will enable those skilled in the art to make and use the same, reference being had to the accompanying drawings, forming part of this specification.

This invention has for its object to provide convenient and ready means for heating flat-irons on stoves and in other situations; and it consists in combining and arranging circular plates of such form as to have a chamber between them for the flat-irons, and so that while the irons are heating they are excluded from the atmosphere, and no part but the handles exposed.

Figure 1 is a top view of the heater.

Figure 2 is a vertical section of fig. 3, through the line $x\,x$.

Figure 3 is a top view of the heater, with the revolving cover off.

Similar letters of reference indicate corresponding parts.

The heater is formed of a flanged plate, A, having a chamber, A', beneath it, and either with or without a bottom. In this example of my invention a bottom, B, is shown. C indicates the flange on the plate A. This plate A has apertures, D, (more or less in number,) sufficiently large to allow a flat-iron to drop down through them, as seen in the drawing, where they rest on the bottom or on the top of the stove, or on a separate plate, as the case may be. In each of the apertures D (in the plate A) there are recesses, e, made for the handle, as seen in fig. 3, so that the handle, while the flat-iron is heating, is placed as seen in fig. 1. F is the top-plate or cover of the heater. This plate is attached to the plate A by a central pivot-handle, G, which handle is secured to the plate A. The plate F rests on the plate A, and is revolved upon it around the centre. It has apertures through it, which correspond in position and number with those through the plate A, but the holes in F are somewhat smaller than those in A. When the plate F is turned, so that the holes in each correspond, the flat-iron may be placed on the bottom, B, with the handles in the recesses e. H represent the irons, and when in this position the top plate or cap F is turned or partially revolved, which covers the flat-iron, as seen in fig. 1, nothing but the handles J being seen.

This heater may be made of any size or any suitable shape, and be placed directly on top of a stove or griddle or other metallic surface, or made with a bottom, as seen in the drawing. By this heater it will be seen that the flat-iron itself is not only protected from currents of air, but the heat is confined in the heating-chamber, and that nothing but the handles are exposed, which are thereby kept comparatively cool. Much less fuel is required to heat the flat-irons in this heater than by the ordinary method. The central pivot G is looped at the top for convenience in handling the heater.

Having thus described my invention, I claim as new, and desire to secure by Letters Patent—

1. The construction and arrangement of the plate A with the flange or side wall C and the plate F, combined and operating substantially as shown and described for the purpose set forth.

2. The chamber A', when formed by two open plates, substantially as and for the purpose described.

S. W. SMITH

Witnesses:
 ED. WHEELER,
 SAMUEL J. BENEDICT.